(12) United States Patent
Chen

(10) Patent No.: US 11,313,108 B2
(45) Date of Patent: Apr. 26, 2022

(54) PUMPING DEVICE

(71) Applicant: Chung-Min Chen, Taichung (TW)

(72) Inventor: Chung-Min Chen, Taichung (TW)

(*) Notice: Subject to any disclaimer, the term of this patent is extended or adjusted under 35 U.S.C. 154(b) by 100 days.

(21) Appl. No.: 17/034,409

(22) Filed: Sep. 28, 2020

(65) Prior Publication Data

US 2021/0095445 A1 Apr. 1, 2021

(30) Foreign Application Priority Data

Oct. 1, 2019 (TW) ................. 108135505

(51) Int. Cl.
| | | |
|---|---|---|
| *F04F 1/06* | (2006.01) | |
| *E03B 3/08* | (2006.01) | |
| *E03B 3/34* | (2006.01) | |
| *F16K 31/34* | (2006.01) | |

(52) U.S. Cl.
CPC ............. *E03B 3/08* (2013.01); *E03B 3/34* (2013.01); *F16K 31/34* (2013.01); *F04F 1/06* (2013.01); *Y10T 137/8622* (2015.04); *Y10T 137/86051* (2015.04)

(58) Field of Classification Search
CPC .......... E03B 3/08; E03B 3/34; E03B 3/00–40; F16K 31/18; F16K 31/34; F03B 17/04; F03B 17/06; Y10T 137/2754; Y10T 137/2768; Y10T 137/2795; Y10T 137/86051; Y10T 137/8622; Y10T 137/8637; G05D 7/0146; G05D 7/0113; G05D 7/0166; G05D 16/12; F04F 1/00–20

USPC ....... 137/129, 131, 135, 206, 209, 413, 415, 137/43, 202; 417/118–149
See application file for complete search history.

(56) References Cited

U.S. PATENT DOCUMENTS

| | | | | |
|---|---|---|---|---|
| 4,181,470 A | * | 1/1980 | Gillett ................. | A01K 63/047 417/136 |
| 4,265,599 A | * | 5/1981 | Morton ................ | F04F 1/06 417/54 |
| 5,340,283 A | * | 8/1994 | Nagata ................ | F04B 9/107 417/328 |
| 6,167,899 B1 | * | 1/2001 | Chen ................... | F04F 1/12 137/357 |

* cited by examiner

*Primary Examiner* — Craig J Price
(74) *Attorney, Agent, or Firm* — Birch, Stewart, Kolasch & Birch, LLP

(57) ABSTRACT

A pumping device has a container, an inlet pipe, a float barrel, and a discharging pipe. The container has a box containing water and a first gas, and a pressure gauge and a check valve mounted to the box. The inlet pipe connects to a water supply and has a second section erectly disposed within the box and communicating with an inside of the box. The float barrel is disposed within the box, contains a second gas, and has an opening. The second section is mounted through the opening. The discharging pipe has two opposite ends respectively communicating with a water reservoir and the inside of the box. The first gas has a pressure larger than 1 atm. The second gas has a pressure less than 1 atm. Water enters the float barrel. A water level inside the float barrel is higher than a water level inside the box.

4 Claims, 3 Drawing Sheets

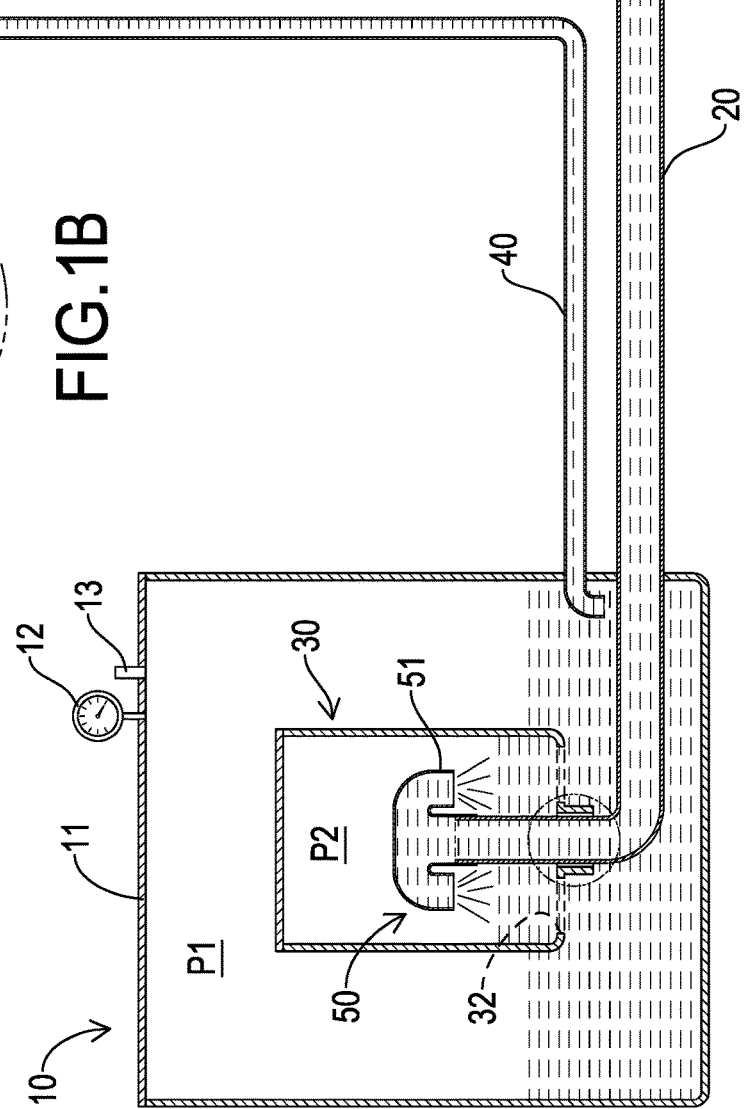
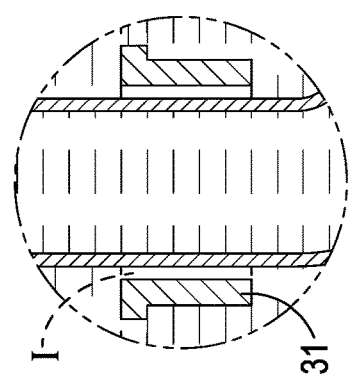

PUMPING DEVICE

BACKGROUND OF THE INVENTION

1. Field of the Invention

The present invention relates to a pumping device, and more particularly to a pumping device with a simple structure and can operate economically.

2. Description of Related Art

Stable water supply becomes a crucial issue in every country due to global climate change. A demand for water has gradually increased with thriving of cities and industries. The water resource has been depleted with the increasing demand for water. In order to reuse water effectively, a conventional means for drawing water disposed at a lower position to a water reservoir disposed at a higher location is provided to draw water by motors with high power.

However, the motor with high power is sophisticated, such that the manufacturing cost of the motor with high power is high. Moreover, in order to draw water from a lower position to a higher position, the motor with high power consumes a lot of energy. Therefore, it is urgent to invent an economical means for economically transporting water.

To overcome the shortcomings of the conventional means for transporting water, the present invention provides a pumping device to mitigate or obviate the aforementioned problems.

SUMMARY OF THE INVENTION

The main objective of the present invention is to provide a pumping device that can move water economically.

The pumping device has a container, an inlet pipe, a float barrel, and a discharging pipe. The container has a box containing water and a first gas, and a pressure gauge and a check valve mounted to the box. The inlet pipe connects to a water supply and has a second section erectly disposed within the box communicating with an inside of the box. The float barrel is disposed within the box, contains a second gas, and has an opening. The second section is mounted through the opening. The discharging pipe has two opposite ends respectively communicating with a water reservoir and the inside of the box. The first gas has a pressure larger than 1 atm. The second gas has a pressure less than 1 atm. Water enters the float barrel. A water level inside the float barrel is higher than a water level inside the box.

Other objects, advantages, and novel features of the invention will become more apparent from the following detailed description when taken in conjunction with the accompanying drawings.

BRIEF DESCRIPTION OF THE DRAWINGS

FIG. 1A is a schematic view of a first embodiment of a pumping device in accordance with the present invention;

FIG. 1B is an enlarged schematic view of the pumping device in FIG. 1A;

DETAILED DESCRIPTION OF PREFERRED EMBODIMENTS

Figure 2:
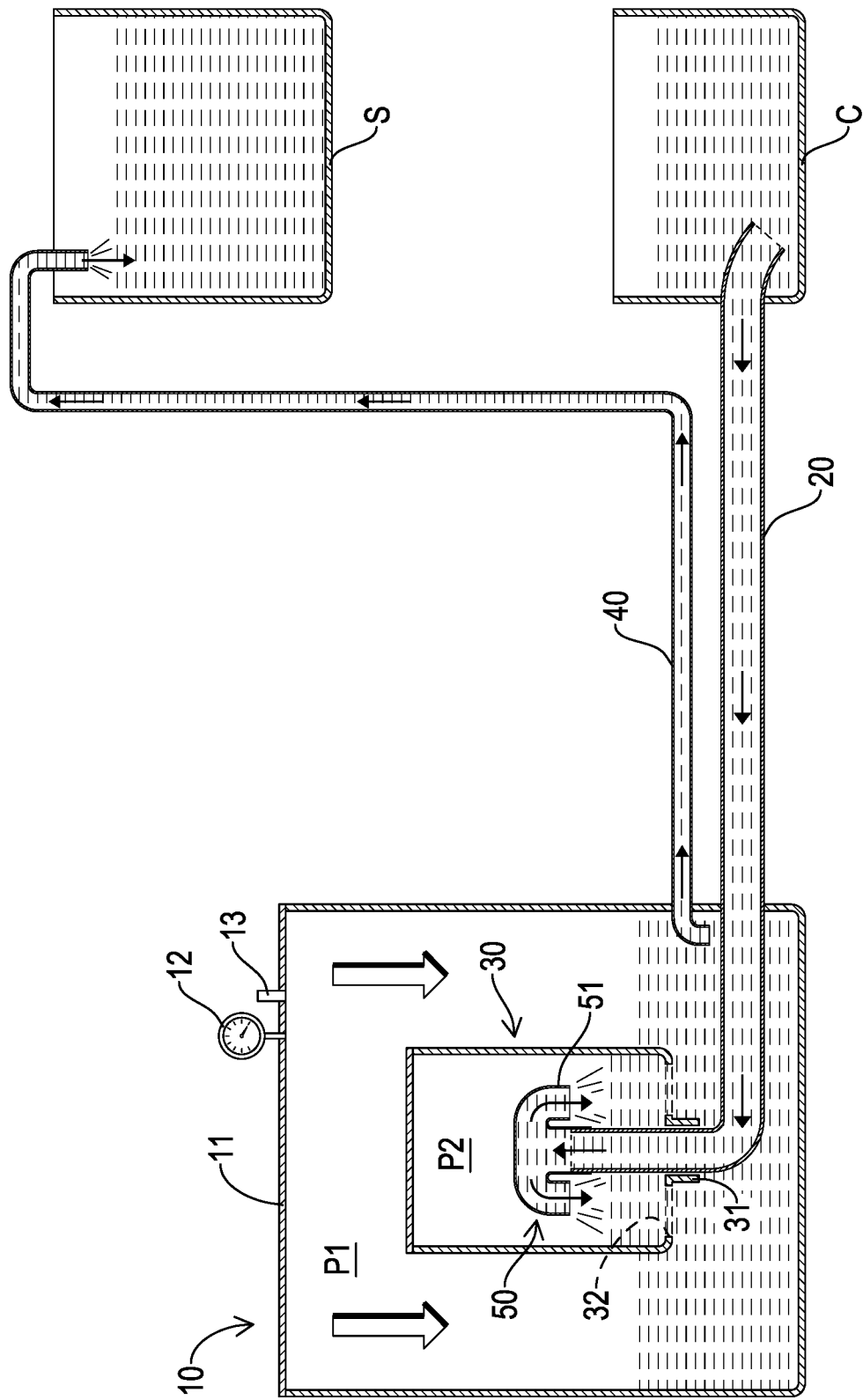
FIG. 2 is another schematic view of the pumping device in FIG. 1A, showing that the pumping device operates.

With reference to FIG. 1A, a first embodiment of the present invention of a pumping device in accordance with the present invention has a container 10, an inlet pipe 20, a float barrel 30, a discharging pipe 40, and a three-way pipe connector 50. The inlet pipe 20, the discharging pipe 40, and the three-way pipe connector 50 are mounted to the container 10. The three-way pipe connector 50 is mounted to the inlet pipe 20.

With reference to FIG. 1A, the container 10 has a box 11, a pressure gauge 12, and a check valve 13. The box 11 is an airtight box and contains water and a first gas P1.

The pressure gauge 12 and the check valve 13 are disposed at a top of the box 11 and communicate with an inside of the box 11. The pressure gauge 12 is configured to measure a gas pressure of the first gas P1. The check valve 13 is configured to only allow gas outside the box 11 to enter the box. The check valve 13 is connected to a pneumatic compressor to make the gas pressure of the first gas P1 larger than 1 standard atmosphere (atm).

With reference to FIG. 1A, the inlet pipe 20 has a first section and a second section communicating with each other. The first section connects to a water supply C and is positioned below a water level of the water supply C. The water supply C may be lower reaches of a river, a lake, or a reservoir of rainwater. The inlet pipe 20 extends inside the box 11, and the second section of the inlet pipe 20 is erectly disposed within the box 11. The second section has a terminal end disposed above a water level of the water within the box 11.

With reference to FIGS. 1A and 1B, the float barrel 30 is hollow, is disposed within the box 11, and contains a second gas P2. The water disposed within the box 11 provides the float barrel 30 with buoyancy, and the float barrel 30 floats on the water within the box 11. The float barrel 30 has a bottom, an opening 31, and at least one communicating hole 32. The bottom of the float barrel 30 is disposed in the water within the box 11. The opening 31 is formed through the bottom of the float barrel 31. The at least one communicating hole 32 is disposed adjacent to the opening 31 of the float barrel 30 and communicates with the inside of the float barrel 30. The float barrel 30 is mounted around the second section of the inlet pipe 20 with the second section of the inlet pipe 20 mounted through the opening 31. An annular passage I is formed between the second section of the inlet pipe 20 and the bottom of the float barrel 30. The annular passage I connects the inside of the float barrel 30 and the inside of the box 11. A gas pressure of the second gas P2 is lower than 1 atm such that the water contained within the float barrel 31 enters an inside of the float barrel 31 and has a water level higher than the water level of the water contained within the box 11. The pneumatic compressor connected to the check valve 13 pressurizes the first gas P1 such that the water in the box 11 enters the float barrel 30. The first gas P1 and the second gas P2 may be a same gas with an identical composition. The second gas P2 inside the float barrel 30 can be drawn out of the float barrel 30 via a pressure relief device such as a relief valve or a pneumatic drawer.

With reference to FIG. 1A, the discharging pipe 40 has two opposite ends. One of the two opposite ends of the discharging pipe 40 communicates with the inside of the box 11 and is disposed beneath the water level of the water within the box 11. The other one of the two opposite ends of the discharging pipe 40 is disposed above a water level of a water reservoir S and discharges water to the water reservoir S.

With reference to FIG. 1A, the three-way pipe connector 50 has three branches 51. One of the three branches 51 is connected to the terminal end of the second section of the inlet pipe 20. The other two branches 51 extend downward. The three-way pipe connector 50 prevents water introduced by the inlet pipe 20 from spurting and from directly pushing the float barrel 30. The three-way pipe connector 50 keeps the float barrel 30 stably mounted to the inlet pipe 20.

With reference to FIGS. 1A, 1B, and 2, the float barrel 30 is disposed within the box 11, is mounted around the second section of the inlet pipe 20, and floats on the water within the box 11. Since the gas pressure of the first gas P1 is larger than 1 atm and the gas pressure of the second gas P2 is lower than 1 atm, the pressure of the second gas P2 is lower than the gas pressure of the first gas P1. Therefore, the water within the box 11 from the water supply C enters the float barrel 30, and the water level of the water within the float barrel 30 is higher than the water level of the water within the box 11. A height difference is defined between the water level of the water within the float barrel 30 and the water level of the water within the box 11. When a pressure caused by the height difference plus the gas pressure of the second gas P2 is higher than the gas pressure of the first gas P1, the water within the float barrel 30 flows into the box 11. The water contained within the box 11 is subjected to the gas pressure of the first gas P1 and flows to the water reservoir S via the discharging pipe 40. The amount of components of the pumping device in accordance with the present invention is less. The pumping device in accordance with the present invention can be assembled with ease. Manufacturing cost of the pumping device in accordance with the present invention is reduced accordingly.

Figure 3:
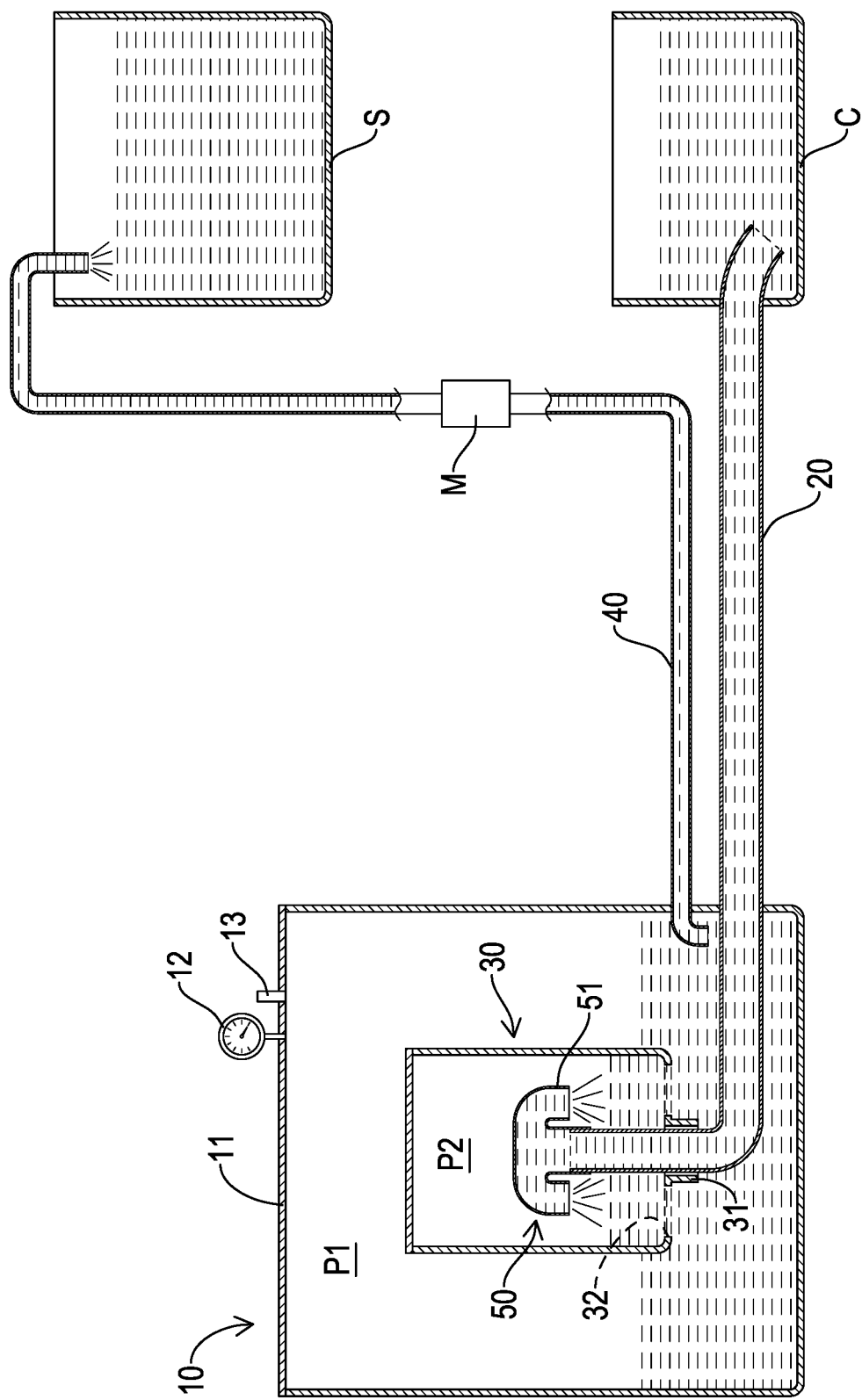
FIG. 3 is a schematic view of a second embodiment of the pumping device in accordance with the present invention.

A second embodiment of the pumping device in accordance with the present invention is shown in FIG. 3. The second embodiment further has a motor M with low power. With the assistance of the motor M, the water contained in the box 11 can be rapidly transported to the water reservoir S. The motor M with low power may even facilitate water to be transported to the water reservoir S located at a higher position. The motor M promotes the function of the pumping device in accordance with the present invention.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A pumping device comprising:
    a container having
        a box being airtight and containing water and a first gas, the first gas disposed above the water within the box, and a gas pressure of the first gas being larger than 1 standard atmosphere (atm);
        a pressure gauge mounted to the box and communicating with an inside of the box; and
        a check valve mounted to the box and communicating with the inside of the box, wherein the check valve only allows gas outside the box to enter the box;
    an inlet pipe having
        a first section connecting to a water supply;
        a second section communicating with the first section, erectly disposed within the box, and having a terminal end disposed above a water level of the water inside the box; and
    a float barrel being hollow, disposed within the box, and floating on the water within the box, and the float barrel containing a second gas and having
        a bottom disposed in the water within the box; and
        an opening formed through the bottom of the float barrel, wherein the second section of the inlet pipe is mounted through the opening, an annular passage is formed between the second section of the inlet pipe and the bottom of the float barrel, and a gas pressure of the second gas is lower than 1 atm such that the water contained within the float barrel enters an inside of the float barrel and has a water level higher than the water level of the water contained within the box; and
    a discharging pipe having two opposite ends, one of the two opposite ends of the discharging pipe communicating with the inside of the box and disposed beneath the water level of the water within the box and the other one of the two opposite ends of the discharging pipe discharging the water within the box to a water reservoir;
    wherein a pressure caused by a height difference between the water levels plus the gas pressure of the second gas is higher than the gas pressure of the first gas, the water within the float barrel flows into the box; and the water contained within the box is subjected to the gas pressure of the first gas and flows to the water reservoir via the discharging pipe.

2. The pumping device as claimed in claim 1, wherein the float barrel has at least one communicating hole disposed adjacent to the opening of the float barrel and communicating with the inside of the float barrel and the inside of the box.

3. The pumping device as claimed in claim 1, wherein
    the pumping device has a three-way pipe connector having three branches;
    one of the three branches is connected to the terminal end of the second section of the inlet pipe; and
    the other two branches extend downward.

4. The pumping device as claimed in claim 2, wherein
    the pumping device has a three-way pipe connector having three branches;
    one of the three branches is connected to the terminal end of the second section of the inlet pipe; and
    the other two branches extend downward.

* * * * *